United States Patent [19]

McLaughlin et al.

[11] 4,006,023
[45] Feb. 1, 1977

[54] PHOTOGRAPHIC POLYMERIC COMPOSITION CONTAINING A LEUCO DYE CYANIDE

[75] Inventors: William L. McLaughlin, Washington, D.C.; Harry Levine, Silver Spring; Marvin Rosenstein, Rockville, both of Md.

[73] Assignee: The United States of America as represented by the Secretary of the Department of Health, Education and Welfare, Washington, D.C.

[22] Filed: Oct. 7, 1974

[21] Appl. No.: 512,621

[52] U.S. Cl. .............................. 96/90 R; 526/77; 526/218; 526/263; 260/37 N; 260/42
[51] Int. Cl.² .......................................... G03C 1/52
[58] Field of Search ................. 96/90 PC, 90 R; 260/88.3 L, 80.72

[56] References Cited

UNITED STATES PATENTS

| 2,528,496 | 11/1950 | Chalkley | 96/90 R |
| 2,643,990 | 6/1953 | Ham | 260/88.3 L |
| 2,676,887 | 4/1954 | Chalkley | 96/90 R |
| 3,306,748 | 2/1967 | Chalkley | 96/90 R |

Primary Examiner—Won H. Louie, Jr.
Attorney, Agent, or Firm—Browdy and Neimark

[57] ABSTRACT

A hard, clear, glassy, smooth polymer with a dry surface having a dye precursor therein which forms a permanent color at those areas of the solid polymer that have been irradiated with ultra-violet or ionizing radiation is formed by combining vinyl and/or acrylic monomers, a triphenylmethane cyanide dye precursor and a chemical initiator that is compatible with the dye cyanide and polymerizing in the presence of a slight excess of hydrogen ions in an inert atmosphere.

26 Claims, 1 Drawing Figure

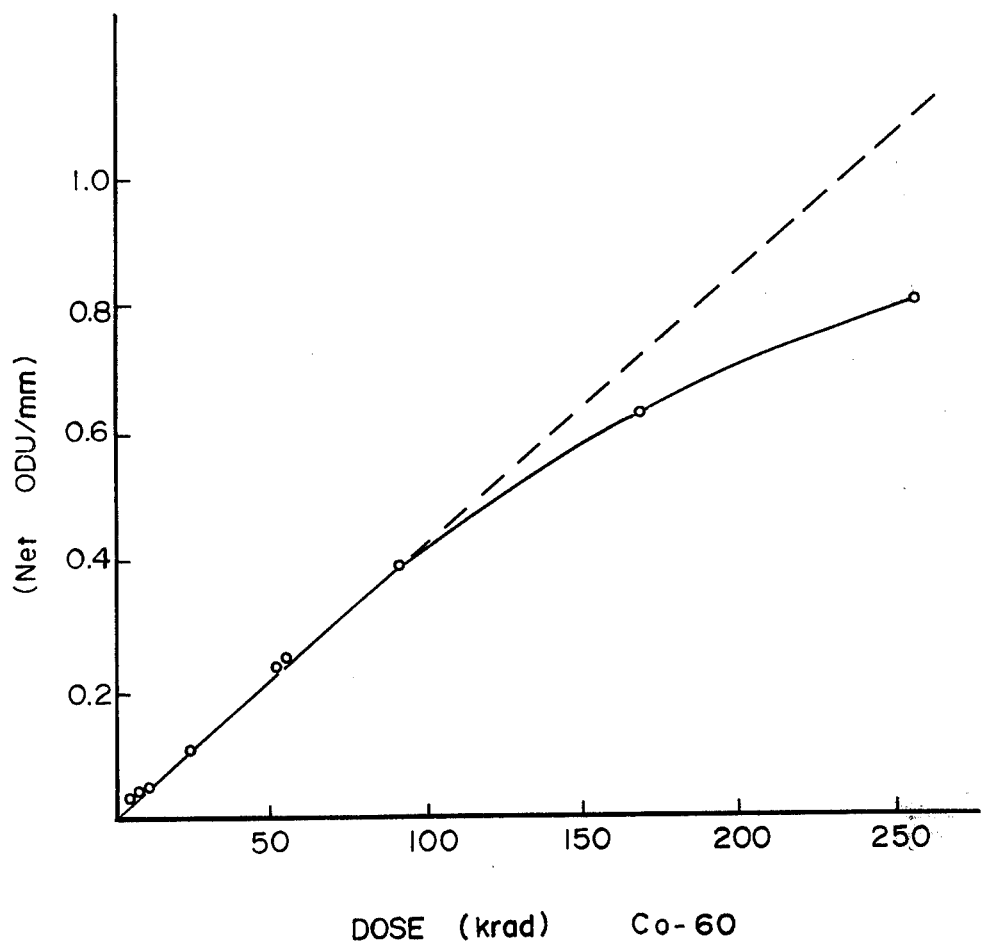

PHOTOGRAPHIC POLYMERIC COMPOSITION CONTAINING A LEUCO DYE CYANIDE

FIELD OF THE INVENTION

The present invention relates to solid vinyl and/or acrylic polymers which undergo coloration upon irradiation and to methods of the production thereof.

BACKGROUND OF THE INVENTION

It has long been known that the triphenylmethane dyes, which are triphenylmethane derivatives containing at least one auxochromic group, such as amino, para to the central methane carbon atom, form leuco cyanides which in the presence of certain activators become photosensitive to ultra-violet and shorter wave lengths of photons to produce colored compounds but which are not sensitive to light in the visible range. It is also well known, as disclosed in U.S. Pats. No. 2,855,303 and No. 3,306,748, that various film-forming hydrocolloids or polymers may be used as activators for triphenylmethane dye cyanides. Such thin films have been produced and used in the area of radiation dosimetry. Until the present work, the solid activator matrix that best sensitized radiolytic dye production was gelatin. Gelatin, however, has the serious problems of dimensional instability and migration of the dye formed after irradiation.

Furthermore, while thin films of these triphenylmethane dye cyanides have been used successfully for accurate determination of one-and two-dimensional depth-dose distributions in various high-Z and low-Z materials and multilayer absorbers using high absorbed doses of x-and gamma rays and electrons, these films cannot successfully be used for studying three-dimensional dose distributions in solid media. For example, when a three centimeter-thick gelatin matrix incorporating the dye cyanide is used to determine doses of greater than $10^3$ rads, it is observed that the gelatin undergoes shrinkage after setting and exhibits poor dimensional stability and a tendency for the dye to diffuse into the medium after irradiation. Accordingly, there is a need in the art for the development of a more mechanically stable solid system in which the desirable dosimetric characteristics of the dye cyanide are preserved and in which the dye cyanide is more sensitive to radiation.

It should be understood that while it is known that such dye cyanides may be activated in polyvinyl pyrrolidone systems as disclosed in U.S. Pat. No. 3,306,748, these systems can only be cast as thin films because they are formed by dissolving the dye cyanide into a solution of the polymer.

SUMMARY OF THE INVENTION

The present invention solves the problems recognized in the prior art and comprises a three-dimensional, solid, glassy vinyl or acrylic polymer having the dye cyanide dispersed therein. This polymer has a wide application as a radiation sensor and three-dimensional radiation imaging device. It has long shelf-life, stable color after irradiation, no post-radiation development requirement, no turbidity or grain, moldability and linear radiation response (optical density versus energy absorbed).

The polymer of the present invention is the polymerization product of vinyl and/or acrylic monomers, preferably including a vinyl pryrrolidone as one of the monomers, which when polymerized into a solid polymetric matrix will provide a host material for radiochromic triphenylmethane dye cyanides. The monomer solution contains a hydrophobic triphenylacetonitrile compound and a chemical initiator which is compatible with the dye precursor. Typical vinyl or acrylic monomer initiators such as the benzoyl peroxides are not compatible with the dye cyanides and, in fact, inhibit dye formation under irradiation. The azo-type catalysts, however, such as the azo-linked dimers of isobutyronitrile are capable of initiating the copolymerization of vinyls and unsaturated polyesters at a temperature less than those temperatures which may be destructive to the dye precursors and without interfering with dye formation under irradiation.

The monomer solutions should also be treated to insure a slight excess of hydrogen ions relative to the concentrations of dye precursor molecules. This can be accomplished by passing the monomers through a mildly acid ion exchange resin or by adding a small quantity of weak acid.

DESCRIPTION OF THE PREFERRED EMBODIMENTS

The essential ingredients necessary for producing the polymer in accordance with the present invention include the monomer, the dye cyanide, the initiator and a slight excess of hydrogen ions.

It is important that the vinyl and/or acrylic monomers used will polymerize into a solid non-tacky clear polymeric matrix which will provide a host material and act as an activator for radiochromic triphenylmethane dye cyanides. The final solidified medium must have a dielectric constant of greater than 4 for the radiochromic action to occur. In other words, the sensitive colorless dye precursor must be in solid solution with a fairly polar medium in order for the radiolytic production on dye to be successful. Polymethylmethacrylate by itself, for example, is not sufficiently polar to activate the radiochromic reaction but when combined in a polar medium such as polyvinyl pyrrolidone the system will be sensitive to irradiation and serve as a radiation sensing polymer by undergoing coloration upon irradiation by deep ultra-violet photons or ionizing radiation. The monomer mixture must be polymerizable by the action of a dye-compatible initiator without excess heat which might destroy the dye. This polymerization should occur with no more than slight shrinkage during polymerization. N-vinyl-2-pyrrolidone monomer (or a substituted form of this monomer) as one of the primary ingredients has the advantage that it is a solvent for the triphenylmethane dye precursor and that it helps stabilize the radiation-colored system against spontaneous bleaching. It is also capable of being polymerized into a transparent resin in combination with the other necessary ingredients which is an important condition for most applications covered by this invention.

The examples of monomer systems which are operable in the present invention include between 40 and 80 percent by weight of one or a combination of the following monomers:

N-vinyl-2-pyrrolidone;
3,4 or 5-methyl-N-vinyl-2-pyrrolidone;
3,4 or 5-ethyl-N-vinyl-2-pyrrolidone;
3,3-dimethyl-N-vinyl-2-pyrrolidone;
5-hydroxy methyl-N-vinyl-2-pyrrolidone.

As copolymer, 20–60% of one or a combination of the following vinyl and unsaturated polyester monomers may be used:

vinyl acetals; vinyl halides; $C_1$–$C_4$ alkyl vinyl ethers such as isobutyl vinyl ether; vinyl stearate; vinyl propionate; vinyl methacrylate; N-vinyl benzyls; N-vinyl succinimide; N-vinyl lactams; methyl methacrylate; methacrylic acid; acryonitrile; methyl acrylate; and other alkyl acrylates and methacrylates such as $C_1$–$C_4$ alkyl acrylates and $C_1$–$C_4$ alkacrylates. Other vinyl monomers or unsaturated polyester monomers may also be included as co-monomers.

The hydrophobic triphenylmethane dye cyanides for use in the present invention have amino groups or substituted amino groups in at least 2 of the para-positions of the 3-phenyl groups. The substitutions of the H-groups of the amino radicals may consist of alkyl groups, moderately hydrophilic groups such as hydroxyl alkyl groups, or other substituted phenyl groups. There may also be other substitutions at other positions on the main three phenyl groups. Reference is made to U.S. Pat. No. 3,306,748. Such triphenylacetonitrile compounds will have the following formula:

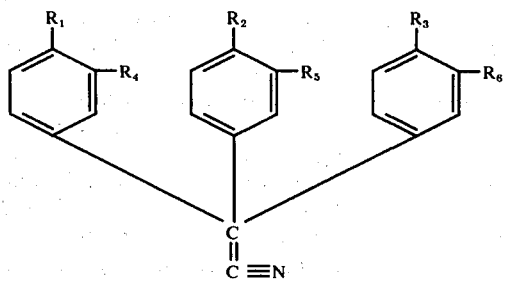

wherein at least two of $R_1$, $R_2$ and $R_3$ are:

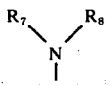

wherein $R_7$ and $R_8$ are hydrogen, $C_1$–$C_4$ alkyl, $C_1$–$C_4$ hydroxyalkyl, or $C_1$–$C_3$ alkylated or halogenated benzyl, and the third of $R_1$, $R_2$ and $R_3$ is either:

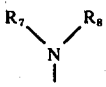

as defined above or hydrogen, and wherein $R_4$, $R_5$ and $R_6$ are hydrogen or methyl.

Upon irradiation, the CN radical splits off and the dye salt is formed by internal conversion of one of the phenyls into the para-quinonoid chromophoric structure of the deeply colored carbonium ion.

Some preferred precursor compounds include the cyanide of:

Pararosaniline, hexahydroxyethyl pararosaniline, setoglaucine, new fuchsin, malachite green, and crystal violet.

These dye precursors should be present in concentration of about 1 to about 15% by weight. The lower limit is determined by the need for a wide latitude of coloration and sensitivity due to radiation and the upper limit by the solubility of the dye precursors in compatible solvents.

It is important that the initiator of the polymerization be compatible with the triphenylmethane dye cyanides. The azotype catalysts are known, for example from U.S. Pats. No. 2,471,959 and No. 2,500,023. These compounds are characterized as an azo-compound wherein the azo group, —N = N—, is acyclic and bonded from both of the nitrogens to carbons which are aliphatic in character and at least one of which carbons is tertiary. Such azo-compounds initiate the copolymerization of vinyl and unsaturated polyesters and are capable of doing this at a temperature less than temperatures which may be destructive to the dye precursors (approximately 70° C. The initiator should be soluble in one of the monomers or in a solvent compatible with the other necessary ingredients. When used at a proper temperature and in proper concentration, the polymerization proceeds slowly enough to provide an optically clear, uniform solid polymer without bubbles, discontinuities, striations, etc. Examples of such initiators include the azo-linked dimers of isobutyronitriles, isopropionitriles, isovaleronitriles and isocapronitriles and more specifically:

2,2'-azo-bis-2-methylacetonitrile;
2,2'-azo-bis-2-methylpropionitrile'
2,2'-azo-bis-2-methylbutyronitrile; and
2,2'-azo-bis-2-methylvaleronitrile.

The use of between about ½ and 2% by weight of the polymerization initiators of this type when used at temperature ranges for polymerization of between 40° and 50° C for 4 to 24 hours of polymerization gives a hard, clear, dry radiation-sensing polymer.

It is important for the monomer solution to have a slight excess of H-ions (weak acid) relative to the concentrations of dye precursor molecules as for example, with the presence of 1 to 3 molecular equivalents of a carboxylic acid. The mild acid promotes the radiation-induced color and prevents back reactions to a colorless system (see U.S. Pat. No. 2,441, and No. 2,528,496). Preferably, the monomers are passed through a mildly acid (e.g. acetic acid) ion exchange resin which serves the purposes of eliminating impurities such as basic monomer stabilizers (e.g.NaOH) that may affect the keeping qualities of the system, and eliminating the need for adding small amounts of acid to the medium. One passage of each monomer through the mild acid ion exchange column is sufficient to optimize the keeping qualities of the final system. It is important to incorporate the optimal amount of acids. Too little (equivalent to less than 0.1% acetic acid) results in instability of color in the irradiated system, so that subsequent measurement of the color shade in a radiation dosimeter, actimeter or imaging system is made difficult by spontaneous fading. Too much (equivalent to greater than 1% acetic acid) quenches the radiation sensitivity of the system.

If sufficient acidity is not provided by passing the monomers through a mildly acid ion exchange resin before polymerization, the addition of one of the following acids may be necessary:

acetic acid; cyanoacetic acid; citric acid; coumalic acid; barbituric acid; arachidic acid; styrylacetic acid; cinnamic acid, etc.

It should be noted that strong mineral acids and formic and benzoic acids are not recommended as they have oxidation states too high to be compatible with the dye precursors.

It is important that the polymerization be carried out in an oxygen-free environment. An inert gas, burning flue gas, or nitrogen blanket during polymerization helps the polymerization to proceed to relative completion such that a tacky resinous system is not formed but rather a hard, clear polymer with a dry surface and smooth, glassy properties. Atmospheric oxygen retards polymerization of vinyl and acrylic systems, when using the present techniques. Preparation of the monomer mixture before elevating the temperature for polymerization preferably includes degassing briefly in a vacuum bottle and saturation with an inert gas or nitrogen gas for a few minutes at normal room temperatures. The monomer solution is preferably cast into a mold for polymerization.

Other possible ingredients for improving the properties of the radiation-sensing polymers include solvents, plasticizers, moisture reducers, ultra-violet absorbers and mild oxidizing agents.

With regard to the solvents, it should be noted that monomer solvents are not needed for the purposes of this invention. It has been found that shrinkage is excessive when such solvents are used. The various specified monomers are compatible with each other and form clear firm resins with minimal shrinkage without need for casting from solution.

Dye-precursor solvents, other than some of the vinyl monomers, may be useful. The hydrophobic para-amino-triphenylmethane dye cyanides besides being somewhat soluble at room temperatures (approximately 2% by weight) in the vinyl pyrrolidone monomers, are also very soluble in some organic solvents compatible with the other ingredients of the resin. Small additions of these solvents (less than 15% by weight of the total system) help achieve maximum concentrations of 10 to 15% by weight of the dye cyanides in the system, thus giving greater radiation sensitivity, which is approximately proportional to the concentration of the dye precursor up to this concentration. The relatively small amounts of solvents used (having fairly low vapor pressure) also play the role of plasticizers, preventing some resins from being brittle. Successful solvents for these purposes must also be polar solvents, which is an important condition for activating the ultimate radiochromatic response. Examples are:

Carboxylic acid amides, such as N,N-dimethyl formamide, N,N-diethyl formamide, and N,N-dimethylacetamides (see U.S. Pat. No. 2,936,235);

Polyoxy compounds containing at least one ether group, such as ethylene glycol monomethyl ether, ethylene glycol monoethyl ether, ethylene glycol diethyl ether, tetraethylene glycol dimethyl ether, and polyethylene glycol of morerately low molecular weight (between about 200 and 400 ethoxy groups) (see U.S. Pat. No. 2,676,887); and Dimethyl sulfoxide. (See U.S. Pat. No. 3,122,438).

As polymerization initiator solvent, acrylic monomers are good solvents for the azo-type initiators. In the preparation of the monomer mixture before polymerization, the initiator may first be dissolved in the acrylic monomer component, which is added last to the mix.

When the vinyl and acrylic monomers are polymerized to relative completion (minimal residual monomer), the glassy resin may tend to be brittle and susceptible to crazing, cracking, and embrittlement upon handling or extended storage in air. The presence of small concentration of plasticizers (between about 0.01 and about 5 percent by weight) helps eliminate this effect. Plasticizers with relatively low volatility that may be used are:

a. The solvents of the triphenylmethane dye cyanide cited earlier (e.g. N,N-dimethyl formamide, polyethylene glycol, ethylene glycol monomethyl ether, dimethyl sulfoxide).

b. Some other solvents for the dye cyanides are also useful plasticizers, such as phosphoric acid esters (e.g. triethyl phosphate, tributyl phosphate, tricresylphosphate).

C. Some commercial compounds such as Flexol (Union Carbide Corp.) also work as plasticizers.

Although water itself is a plasticizer in some hydrophilic vinyl resins, such as polyvinyl pyrrolidone, excessive water absorption by the system either during or after polymerization can cause disadvantages. The moisture can impart an eventual tackiness, uneven dye distribution, a bloom, spottiness, or heterogeneous opacity to the resin, and can affect adversely the dye cyanide response to radiation and change that response with increasing storage periods in a humid environment. The addition of so-called "tack reducers" (moisture inhibitors) may inhibit the adverse moisture effects in situations where the systems will be subjected to aqueous environments during polymerization, storage, irradiation, or photometric analysis of color formation. Suggested tack reducers compatible with essential resin ingredients are (in concentrations of between 0.01 and 2%): polyacrylic acid, dimethyl phthalate, tannic acid, polyvinyl acetate, polyvinyl halogens, polyvinyl toluenes, phenolic resins, shellac, polyacrylonitrile (the last of which can be polymerized in concentrations up to 60% as part of the resin). Also some commercial tack reducers may be used, e.g. Santicizer (Monsanto Corp.), Santolite (Monsanto Corp.) and Glyptal (General Electric Co.). Approximately a 1% addition of polyacrylic acid appears to be especially helpful in that it serves several purposes: (1) moisture inhibition; (2) shrinkage reduction; (3)reduction of heat evolution giving bubbles in the system; and (4) clarification of the system.

Ultra-violet radiation is detrimental to the shelf life of the final system in that it colors the system (as under daylight or fluorescent illumination) before it can be used as a radiation sensor. Useful in some situations where ultra-violet sensitivity must be quenched or where the system must be used in daylight situations is a coating of an ultra-violet shielding substance, in spite of the fact that the polymeric materials (vinyls and acrylics) are themselves ultra-violet absorbers. The uv wavelength threshhold for coloring most of the triphenylmethane dye cyanides in solid solution lies between about 3300 and 3500 A. Accordingly, the preferable uv absorbers are those which block out all uv wavelengths starting at a point between 3300 – 3600 A. Examples of some suitable uv absorbers compatible with the systems are certain substituted benzophenone compounds (a series of di hydroxy or tetrahydroxy - [methoxy] - benzophenones), aesculin or aesculeting polyhaloaryltriazoles, some dihydroxy coumarins, etc., which may be used in a varnish to coat the outside of the radiation sensing polymer. Some are sold under trade names of Uvinul (General Aniline and Film Corp.), Tinuvin (Geigy Chemical Corp.), Anti-Fading Varnish (Agfa-Gevaert Inc.), etc. These uv blocking agents cannot be incorporated in the matrix materials of the invention, because even in very small concentrations they inhibit polymerization.

Although the radiation response does not depend on the presence or absence of atmospheric oxygen in the matrix material, the presence of a small amount of a weak oxidizing agent can play a role in boosting the efficiency of the radiation response and can help promote the radiation response. In most instances, too little (less than 0.001%) has an insignificant effect and too much (more than 0.1%) inhibits polymerization and radiolytic dye formation and tend to reduce the shelf life of the solid system. Each suggested photo-oxidant has an optimum concentration. in this range. The oxidant can also provide the advantage of increasing the linear range of the system (optical density increase versus radiation exposure time).

a. Some photo-oxidizing agents that were not successful because they inhibit polymerization:
quinones and semiquinones, naphthaquinones, haloalkyl quinoxalines, halogenated nitopyrimidines, phenols, phenazines, halogenated quinones (e.g. chloranil), benzophenones, diphenylamines, and alkyl halides b. Some photo-oxidizing agents showing no appreciable increase in response:
polyoxyboroxines, benzotriazoles and bibenzotriazoles, triphenyl stilbene, phenazines, epichlorohydrin, nitrobenzene, halobiphenyls, haloindazoles, halothiophenes, halopyridines, and halopyrimidines.

c. The only successful photo-oxidizing agents that could be incorporated at the indicated concentrations and impart appreciable increase in response are:
1. polyhalonitrobenzenes (0.003% by weight)
Examples: pentachloronitrobenzene; 2,3,4,5-tetrachloro-nitrobenzene
2. polyhalobenzenes (0.04% by weight)
Examples: 1,4-diiodobenzene; 1-chloro-4-iodobenzene; 2,4,6-tribromoiodobenzene
3. hypoxanthine (0.02% by weight)
4. polyhaloimidazoles (0.005% by weight)
Examples: 2,4,5-tribromoimidazole; 2,4,5-trichloroimidazole
5. halogenated mono-or polyaryl biimidazoles (0.005% by weight)
Examples: 2,2'-bis-(2,4 dichlorophenyl) 4,4',5,5'-tetraphenylbiimidazole; 2,4,5, tris-(o-chlorophenyl)-imidazole.

For the latter class of compounds see U.S. Pat. No. 3,445,233, No. 3,390,994 and No. 3,390,996. Since these photo-oxidants are used in very small concentrations, they are easily brought into solution in the solvents of the dye precursors (e.g. N,N-dimethyl formamide) and may be added after the dye precursor has been dissolved.

EXAMPLE 1

The following monomers are passed through an ion exchange column containing a weakly acidic (carboxylic of the polymethylmethacrylate type) cation exchange resin:

30 ml N-vinyl-2-pyrrolidone
10 ml methyl methacrylate
20 ml acrylonitrile

In a flask 1.8g hexahydroxyethyl pararosaniline cyanide and 0.45 g. polyacrylic acid are dissolved in the N-vinyl-2-pyrrolidone. The acrylonitrile is added with continued stirring. Then the methylmethacrylate in which 0.6g 2,2'-azo-bis-2-methylpropionitrile has been dissolved just prior to mixing with the other ingredients is added. Stirring is continued for several minutes until thoroughly mixed. This solution is degassed for a few seconds under vacuum, and then nitrogen or argon gas is bubbled through the solution for a few minutes, with occasional shaking. The solution is poured into a mold and put into an oven containing nitrogen gas flow for 8 hours at 48° C. After this period, the resulting clear, glassy solid polymer material will have suffered very little shrinkage and will be sensitive to coloration to deep blue-violet upon exposure to intense ionizing radiation or deep ultra-violet radiation.

The FIGURE is a calibration curve for the dye-cyanide polymer of Example I up to 250 krad, using Co-60 gamma-rays. The dosimeter response (measured as net optical density per millimeter thickness) is linear and most useful over a dose interval that spans two orders of magnitude (1–100 krad). Total dose in the linear response region were delivered at three different available dose rates: 42 krad/min., 1.2 krad/min. and 10 rad/min. verifying for the nominal range 10 to $10^5$ rad/min the dose-rate independence observed consistently for formulations utilizing the same dye-cyanide.

EXAMPLE 2

The following monomers are treated with an ion exchange resin as in example 1:

40 ml N-vinyl-2-pyrrolidone
10 ml methyl methacrylate
9 ml isobutyl vinyl ether
1 g vinyl stearate A solution is made (with several minutes stirring with a glass rod) of 12 g hexahydroxyethyl pararosaniline cyanide and 0.6 g polyacrylic acid in 6 ml N,N-dimethylformamide. This solution is stirred into the N-vinyl-2-pyrrolidone. Then the isobutyl vinyl ether and vinyl stearate is added with continued stirring. Finally the methyl methacrylate is added in which 1 g 2,2'-azo-bis-2-methylpropionitrile has been dissolved just prior to mixing with the other ingredients. Then, after thorough mixing, the composition is treated as in example 1 and cast in a mold at the same time and temperature. The resulting solid polymer is somewhat flexible and non-brittle, but retains its shape and has a non-tacky surface. It is very sensitive to coloration by irradiation.

If the solution is poured onto a vinyl or polyacrylic film base rather than into a mold before hardening, it will form a thin, non-grainy radiation-sensitive coating that will serve as a radiographic imaging material. The film base may be coated on both sides for additional sensitivity, by using a slow dipping technique.

EXAMPLE 3

The following monomers are treated with an ion exchange resin as in example 1:

30 ml 3,3-dimethyl-N-vinyl-2-pyrrolidone
20 ml methyl methacrylate
10 g vinyl stearate The procedure in example 2 is repeated with the exception that pararosaniline dye cyanide and only 0.3 g of 2,2′ azo-bis-2-methyl-valeronitrile are used. The solution is poured into a cylindrical mold before the hardening stage. The resulting rod is translucent and soapy in appearance and texture. It may be sliced thin with a sharp cutting edge and provides thin flexible circular films which can be used as radiation dosimeters, or indicators that a given dose has been reached according to the extent of coloration by irradiation.

EXAMPLE 4

Example 3 is repeated substituting vinyl butyrate for vinyl stearate and new fuchsin cyanide for pararosaniline cyanide. No polymerization initiator is used. The solution is cast into a mold at the same time and temperature as Example 1. This polymer is clear and colorless and serves as a high-resolution imaging system for ionizing radiation or deep ultra-violet radiation, forming a magenta image.

EXAMPLE 5

Example 3 is repeated but 5 ml vinyl acetate and 5 g vinyl stearate are substituted for the 10 g vinyl stearate. Also 0.3 citric acid is dissolved in the vinyl pyrrolidone before adding the other ingredients. The results are satisfactory.

EXAMPLE 6

Example 3 is repeated but 5 ml vinyl propionate and 5 ml vinyl methacrylate are substituted for the vinyl stearate. As polymerization initiator only 0.1g 2,2′-azo-bis-isobutyronitrile is used. Again the results are entirely satisfactory.

EXAMPLE 7

The following monomers are treated with an ion exchange resin as in example 1:

24 ml N-vinyl-2-pyrrolidone
24 ml methyl methacrylate
12 ml acrylonitrile 1.2 g crystal violet cyanide, 0.3g cyanoacetic acid, and 0.9 g polyacrylic acid are dissolved in the N-vinyl-2-pyrrolidone. The acrylonitrile is added with continued stirring. Then the methyl methacrylate is added in which 0.9 g 2,2′-azo-bis-isobutyronitrile has been dissolved just prior to mixing with the other ingredients. After thorough stirring, the solution is treated as in example 1 and cast in cylindrical, cubic or rectangular molds. The composition is hardened in an oven for 10 hours at 35° C under a nitrogen blanket. The resulting clear, colorless cylinders, cubes or slabs may have some of their surfaces optically polished flat. They may then be used as three-dimensional high-resolution data storage media to register radiographic images, or, in the case of coherent x- or γ-rays, three dimensional holograms.

EXAMPLE 8

Example 2 is repeated, but also, just before combining the isobutyl vinyl ether and vinyl stearate the following photo-activator is added:

3 mg 2,4,5-tribromoimidazole which has been dissolved in ½ ml N,N-dimethylformamide. The resulting solid polymer is even more sensitive to ionizing radiation and deep ultra-violet photons than is sample 2, but after 6 months' storage, its additional sensitivity becomes diminished slightly, apparently due to the volatile nature of the photo-activator.

EXAMPLE 9

45 ml N-vinyl-2-pyrrolidone and 15 ml polyvinyl pyrrolidone (K-60) dissolved in distilled water is passed through mildly acid ion exchange resins (as in example 1). The combination is brought to pH 5 with glacial acetic acid, and with continued stirring, 6 mg formyl violet cyanide is dissolved in the solution. This viscous solution may be poured into a mold as in previous examples and the resulting solid polymer is quite satisfactory.

EXAMPLE 10

40 ml N-vinyl-2-pyrrolidone and 18 ml acrylonitrile are passed through mildly acid ion exchange resins (as in example 1). 1.8 g setoglaucine cyanide is dissolved in the N-vinyl-2-pyrrolidone. The acrylonitrile is added and with continued stirring 2 ml methacrylic acid containing 0.6g 2,2′-azo-bis-isobutyronitrile is added. Then this mixture is degassed and bubbled with argon or nitrogen gas as in example 1. The mixture is poured into a mold and allowed to harden for 6 hours at 40° C in an oven containing nitrogen atmosphere. The resulting clear hard polymer is a suitable three dimensional ultra-violet sensor and ultra-violet imaging system, since it has minimal self-absorption for ultra-violet rays of about 300 nm wavelength. By spraying or painting the exterior surfaces of the hardened polymer with an ultra-violet blocking agent (such as an "Anti-Fading Varnish" containing a benzophenone or coumarin compound) the response to ultra-violet rays can be stopped, and the radiation response "fixed" thereby.

The device in accordance with the present application has many applications. It may be used for measuring radiation energy deposition (ultra-violet, x-rays, gamma rays, electrons, protons, and other ionizing radiations) as dosimeters. It may be used as a standard material for radiation detection. It may be used as a high-resolution imaging device for registering visually-observable radiographs three-dimensionally.

It can be used as moldable radiation sensors in unlimited shapes and various sizes, so that radiographic imaging can be made in phantom materials simulating other low atomic number media, such as plastics, soft tissue, water, etc. It can be used as a device for beam mapping and area monitoring of radiation intensity profiles. It can be used as an actinometric or dosimetric device which gives a visual or photometrically measurable change of color according to radiation dose level. They can be used as "go-no-go" indicators that show that a certain dose level has been reached by the depth of color. It can further be used as a coherent ultra-violet or x-ray data storage medium with very high resolution capability and three-dimensional storage matrix for registering holograms. It can be used as a radiation-sensitive microtomable or slicable rod.

It should be understood that all of these utilities are merely descriptive and are not limitative of the many uses to which this polymer can be put.

It will be obvious to those skilled in the art that various changes may be made without departing from the scope of the invention and the invention is not to be considered limited to what is described in the specification.

What is claimed is:

1. A process for the production of a photographic thermosetting radiation sensitive polymeric composition comprising the steps of combining:
   i. 83–89.5% by weight of vinyl and/or acrylic monomers, which, when polymerized into a non-tacky solid polymer matrix, provide a host material for radiochromic triphenylmethane dye cyanides, which monomers are chosen to form a final solidified polymer which has a dielectric constant of greater than about 4;
   ii. 1–15% by weight of a hydrophobic, leuco triphenylacetonitrile compound with at least one of the three phenyl groups having at the position para to the central methane carbon atom of a radical of the formula:

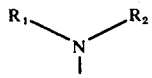

wherein $R_1$ and $R_2$, alike or different, are hydrogen, $C_1 - C_4$ alkyl, $C_1 - C_4$ hydroxyalkyl, or $C_1 - C_3$ alkylated or halogenated benzyl, said radical being alike or different on the various phenyl groups, said compound having hydrogen or methyl on the three phenyl groups at the positions meta to the central methane carbon atom, and
   iii. ½–2% by weight of a chemical initiator of the polymerization of vinyl and acrylic monomers which is compatible with the triphenylacetonitrile compound used, said chemical initiator being an azo compound wherein the azo group is acrylic and bonded on both ends to carbon groups which are aliphatic and have 3–6 carbon atoms and at least one of which carbon atoms is tertiary;
providing mild acidity to the product of said combining step equivalent to the addition of 0.1–1% acetic acid thereto; and
heating in a mold at a temperature in the range below which polymerization will not proceed and above which the auxochromic groups of said triphenylacetonitrile compound are dissociated in an oxygen-free atomsphere, until a three-dimensional, solid glassy vinyl and/or acrylic polymer having said leuco triphenylacetonitrile compound dispersed therein is formed.

2. A process in accordance with claim 1, wherein said said vinyl and/or acrylic monomers comprise 40–80% by weight of N-vinyl-2-pyrrolidone or a $C_1-C_4$ alkyl or $C_1-C_4$ hydroxyalkyl mono- or di-substituted N-vinyl-2-pyrrolidone and 20–60% of other vinyl and/or unsaturated polyester monomers.

3. A process in accordance with claim 1, wherein said vinyl and/or acrylic monomers comprise:
   40–80% by weight of N-vinyl-2-pyrrolidone, 3,4 or 5-methyl-N-vinyl-2-pyrrolidone, 3,4, or 5-ethyl-N-vinyl-2-pyrrolidone, 3,3-dimethyl-N-vinyl-2-pyrrolidone, or 5-hydroxymethyl-N-vinyl-2-pyrrolidone; and
   20–60% by weight of vinyl acetal, vinyl halide, $C_1-C_4$ alkyl vinyl ether, vinyl stearate, vinyl propionate, vinyl methacrylate, N-vinyl benzyl, N-vinyl succinimide, N-vinyl lactam, methyl methacrylate, methacrylic acid, acrylonitrile, methyl acrylate, and/or $C_1-C_4$ alkyl acrylate or $C_1-C_4$ alkacrylates.

4. A process in accordance with claim 1, wherein said vinyl and/or acrylic monomers comprise:
   50% N-vinyl-2-pyrrolidone;
   16–⅔% methyl methacrylate; and
   33–⅓% acrylonitrile.

5. A process in accordance with claim 1, wherein said triphenylacetonitrile compound is selected from the group consisting of the cyanides of pararosaniline, setoglaucine, new fuchsin, malachite green and crystal violet.

6. A process in accordance with claim 1, wherein said chemical initiator is 2,2′-azo-bis-2-methylacetonitrile, 2,2′-azo-bis-2-methylpropionitrile, 2,2′-azo-bis-2-methylpropionitrile, 2,2′-azo-bis-2-methylvaleronitrile.

7. A process in accordance with claim 1, wherein said providing step comprises passing the monomers through a mildly acid ion exchange resin.

8. A process in accordance with claim 1, wherein said providing step comprises adding a sufficient amount of acetic acid, cyanoacetic acid, citric and coulamic acid, barbituric acid, arachidic acid, styrylacetic acid or cinnamic acid.

9. A process in accordance with claim 1 wherein said heating step comprises heating at 40°–50° C for 4–24-hours.

10. A process in accordance with claim 1, wherein in said combining step, said triphenylacetonitrile compound is dissolved in up to 15% by weight of the total system of solvent comprising carboxylic acid amide, polyoxy compounds containing at least one ether group, and dimethyl sulfoxide.

11. A process in accordance with claim 1, wherein said combining step includes dissolving the initiator in the acrylic monomer component last added to the mix.

12. A process in accordance with claim 1, wherein said combining step further includes adding about 0.01 to 0.5% by weight of plasticizer.

13. A process in accordance with claim 1, wherein said combining step further includes about 0.01 to about 2% moisture reducer selected from the group consisting of polyacrylic acid, dimethyl phthalate, tannic acid, polyvinyl acetate, polyvinyl halogen, polyvinyl toluene, phenolic resin, shellac and polycrylonitrile.

14. A photographic thermosetting polymeric composition comprising the three-dimensional, solid glassy vinyl and/or acrylic polymer having leuco triphenylacetonitrile compound dispersed therein, produced by the process of claim 1.

15. A photographic thermosetting polymeric composition comprising the three-dimensional, solid glassy vinyl and/or acrylic polymer having leuco triphenylacetonitrile compound dispersed therein, produced by the process of claim 2.

16. A photographic thermosetting polymeric composition comprising the three-dimensional, solid glassy vinyl and/or acrylic polymer having leuco triphenylacetonitrile compound dispersed therein, produced by the process of claim 3.

17. A photographic thermosetting polymeric composition comprising the three-dimensional, solid glassy vinyl and/or acrylic polymer having leuco triphenylacetonitrile compound dispersed therein, produced by the process of claim 4.

18. A photographic thermosetting polymeric composition comprising the three-dimensional, solid glassy vinyl and/or acrylic polymer having leuco triphenylacetonitrile compound dispersed therein, produced by the process of claim 5.

19. A photographic thermosetting polymeric composition comprising the three-dimensional, solid glassy vinyl and/or acrylic polymer having leuco triphenylacetonitrile compound dispersed therein, produced by the process of claim 6.

20. A photographic thermosetting polymeric composition comprising the three-dimensional, solid glassy vinyl and/or acrylic polymer having leuco triphenylacetonitrile compound dispersed therein, produced by the process of claim 7.

21. A photographic thermosetting polymeric composition comprising the three-dimensional, solid glassy vinyl and/or acrylic polymer having leuco triphenylacetonitrile compound dispersed therein, produced by the process of claim 8.

22. A photographic thermosetting polymeric composition comprising the three-dimensional, solid glassy vinyl and/or acrylic polymer having leuco triphenylacetonitrile compound dispersed therein, produced by the process of claim 9.

23. A photographic thermosetting polymeric composition comprising the three-dimensional, solid glassy vinyl and/or acrylic polymer having leuco triphenylacetonitrile compound dispersed therein, produced by the process of claim 10.

24. A photographic thermosetting polymeric composition comprising the three-dimensional, solid glassy vinyl and/or acrylic polymer having leuco triphenylacetonitrile compound dispersed therein, produced by the process of claim 11.

25. A photographic thermosetting polymeric composition comprising the three-dimensional, solid glassy vinyl and/or acrylic polymer having leuco triphenylacetonitrile compound dispersed therein, produced by the process of claim 12.

26. The photographic thermosetting polymeric composition comprising the three-dimensional, solid glassy vinyl and/or acrylic polymer having leuco triphenylacetonitrile compound dispersed therein, produced by the process of claim 13.

* * * * *

UNITED STATES PATENT AND TRADEMARK OFFICE
CERTIFICATE OF CORRECTION

PATENT NO. : 4,006,023
DATED : February 1, 1977
INVENTOR(S) : William L. Mc Laughlin et al.

It is certified that error appears in the above-identified patent and that said Letters Patent are hereby corrected as shown below:

Column 1, line 67, "pryrrolidone" should read --pyrrolidone-- column 3, lines 18-19, "hydroxyl" should read --hydroxy-- column 3, lines 25-35, that portion of the formula reading $$\begin{matrix}"C" \\ \| \\ C\end{matrix} \text{ should read } \begin{matrix}--C-- \\ | \\ C\end{matrix}$$

column 4, line 42, "No.2,441," should read --No. 2,441,561--

Column 7, line 12, "tend" should read --tends-- column 7, line 21, "nitopyrimidines" should read --nitropyrimidines--

Signed and Sealed this fifth Day of July 1977

[SEAL]

Attest:

RUTH C. MASON
Attesting Officer

C. MARSHALL DANN
Commissioner of Patents and Trademarks